(12) United States Patent
Golcher et al.

(10) Patent No.: US 8,743,510 B2
(45) Date of Patent: Jun. 3, 2014

(54) SHUNT FOR MAGNETORESISTIVE TRANSDUCER HEADS FOR ELECTROSTATIC DISCHARGE PROTECTION

(75) Inventors: Peter J. Golcher, Los Gatos, CA (US); Icko E. T. Iben, Santa Clara, CA (US); Ho-Yiu Lam, Mountain View, CA (US); Jose Luis A. Salenga, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/463,732

(22) Filed: May 3, 2012

(65) Prior Publication Data

US 2012/0212854 A1   Aug. 23, 2012

Related U.S. Application Data

(63) Continuation of application No. 12/015,438, filed on Jan. 16, 2008, now Pat. No. 8,199,444.

(51) Int. Cl.
*G11B 5/40* (2006.01)

(52) U.S. Cl.
USPC ........................................................ 360/323

(58) Field of Classification Search
CPC .................................... G11B 5/11; G11B 5/40
USPC ................ 360/323, 245.2, 245.8, 246, 264.2, 360/266.3
See application file for complete search history.

(56) References Cited

U.S. PATENT DOCUMENTS

| | | | |
|---|---|---|---|
| 5,757,591 A * | 5/1998 | Carr et al. | 360/323 |
| 6,400,534 B1 | 6/2002 | Klaassen | |
| 6,415,500 B1 | 7/2002 | Han et al. | |
| 6,424,505 B1 | 7/2002 | Lam et al. | |
| 6,552,879 B2 | 4/2003 | Voldman | |
| 6,574,078 B1 * | 6/2003 | Voldman | 360/323 |
| 6,728,082 B2 | 4/2004 | Tabat et al. | |
| 6,944,937 B2 | 9/2005 | Hsiao et al. | |
| 6,972,930 B1 | 12/2005 | Tang et al. | |
| 7,119,995 B2 | 10/2006 | Granstrom et al. | |
| 7,239,488 B2 | 7/2007 | Zhu et al. | |
| 7,271,968 B2 | 9/2007 | Jang | |
| 7,392,579 B2 * | 7/2008 | Leung et al. | 29/603.16 |
| 7,486,476 B2 | 2/2009 | Biskeborn | |
| 7,715,141 B2 | 5/2010 | Biskeborn | |
| 8,130,473 B2 * | 3/2012 | Hachisuka | 360/316 |
| 8,270,124 B2 * | 9/2012 | Araki et al. | 360/323 |
| 2006/0018070 A1 | 1/2006 | Iben | |
| 2006/0246581 A1 | 11/2006 | Tomita | |

OTHER PUBLICATIONS

Dovek, M.M. et al., "Combination of Fusible Link and Diodes for Improved MR ESD Protection", IBM, Dec. 1, 1998, pp. 1694-1695, vol. 41, No. 416, Article 416122, IBM, United States.

(Continued)

*Primary Examiner* — Angel Castro
(74) *Attorney, Agent, or Firm* — Kenneth L. Sherman, Esq.; Michael Zarrabian, Esq.; Sherman & Zarrabian LLP

(57) ABSTRACT

A magnetoresistive transducer head assembly includes a reader element, a writer element and a high impedance shunt electrically connecting the reader element and the writer element. The high impedance shunt provides a high impedance conductive path for maintaining electrostatic charge equipotential between the reader element and the writer element.

21 Claims, 9 Drawing Sheets

(56) References Cited

OTHER PUBLICATIONS

Wallash, A. et al., "A Study of Diode Protection for Giant Magnetoresistive Recording Heads", Proceedings of the 1999 Electrical Overstress/Electrostatic Discharge Symposium, Sep. 28-29, 1999, pp. 4B.5.1-4B.5.6, IEEE, United States.

Zhu, L.Y., "ESD Prevention on an Unshunted MR Head", Proceedings of the 1998 Electrical Overstress/Electrostatic Discharge Symposium, Oct. 6-8, 1998, pp. 4B.4.1-4B.4.9, IEEE, United States.

Parkin, S.S.P. et al., "Exchange-biased magnetic tunnel junctions and application to non-volatile magnetic random access memory (invited)", Journal of Applied Physics, Apr. 15, 1999, pp. 5828-5833, vol. 85, No. 8, American Institute of Physics, United States.

Jiang, C.F. et al., "Pulse Stress Testing for Ulta-thin MgO Barrier Magnetic Tunnel Junctions", Proceedings of 2007 29th Electrical Overstress/Electrostatic Discharge Symposium, Sep. 16-21, 2007, pp. 1-6, IEEE, United States.

Iben, T. et al, "Systems and Methods using Diodes to Protect Electronic Devices", IBM, Dec. 20, 2006, pp. 1-3, IBM, United States.

Wichmann, E., "Quantum Physics, Chapter 7: The Wave Mechanics of Schrodinger", Berkeley Physics Course, 2007, pp. 288-292, vol. 4, McGraw-Hill, United States.

U.S. Restriction Requirement for U.S. Appl. No. 12/015,438 mailed Mar. 22, 2011.

U.S. Non-Final Office Action for U.S. Appl. No. 12/015,438 mailed Jun. 20, 2011.

U.S. Final Office Action for U.S. Appl. No. 12/015,438 mailed Nov. 1, 2011.

U.S. Notice of Allowance for U.S. Appl. No. 12/015,438 mailed Feb. 10, 2012.

* cited by examiner

SHUNT FOR MAGNETORESISTIVE TRANSDUCER HEADS FOR ELECTROSTATIC DISCHARGE PROTECTION

CROSS-REFERENCE TO RELATED APPLICATIONS

This patent application is a continuation patent application of U.S. patent application Ser. No. 12/015,438, filed on Jan. 16, 2008, the disclosure of which is incorporated herein its entirety by reference.

BACKGROUND

1. Field of the Invention

The present invention relates to magnetoresistive (MR) heads, and more particularly to protecting MR heads from electrostatic discharge (ESD).

2. Background Information

In magnetic data storage devices, such as those used for tape or hard disk drives (HDD), transducer heads are utilized for reading and writing data on magnetic media. Such transducer heads typically include transducer elements for reading (readers) and writing (writers) magnetic information on magnetic media. The transducer elements are typically small in size and are deposited on a wafer using lithographic techniques.

The readers include magnetoresistive (MR) sensors comprising thin film sheet resistors that are highly susceptible to damage from electrostatic discharge, (ESD), either through Joule heating from high currents or from dielectric breakdown. The writers are inductive, and alone are much less susceptible to ESD damage from high currents because they are built to sustain high writer currents. However, as shown by an example in FIG. 1A, a typical HDD or tape MR transducer head 10 comprises a piggyback structure, wherein components of each reader 12 and writer 14 are separated by one or more relatively thin insulation layers such as oxide layers 16. The reader 12 and writer 14 are encapsulated by a substrate 18 and a closure 19. The writer 14 is stacked on top of the reader 12 vertically in thin film layers. Referring now also to a schematic view of the MR transducer head 10 in FIG. 1B, a reader 12 includes shields 12A-B and a read sensor 12C disposed therebetween. A writer 14 includes writer poles 14A-B separated by a writer gap 14C. Further, leads 22 provide conductive paths to the reader 12 and the writer 14.

The insulation layers between the readers and writers are susceptible to dielectric breakdown with damaging electric field levels on the order of $1 \times 10^8$ to $2 \times 10^8$ V/m. One specific failure mode that takes place in the piggyback structured MR as in FIG. 1 is shorting between the reader 12 and writer 14 within the same transducer element 10. For an insulation layer thickness of 0.6 microns, a voltage differential of 60-120 V will result in dielectric breakdown leading to ESD failure and resulting damage.

ESD damage is a detractor for production yield during the transducer head manufacturing process. ESD damage can manifest in MR sensor resistance value as over high limit (OHL), as under low limit resistance (ULL) measurement and any value in-between. Subtle ESD damage can also be magnetic in nature and may not be readily observable as a change in resistance. The likelihood of shorting events between readers and writers due to ESD can be as high as the typical OHL failure mode. Extant tape heads contain upwards of 30 to 40 reader-writer pairs per tape head, such that a per-transducer loss as low as 0.1% translates to a large loss of 3 to 4% loss of tape heads.

Referring to FIG. 2, in tape head manufacturing, a flexible cable 20, which is made of an insulating material, such as Kapton (polyimide), is bonded to the tape head module to provide current passage to all the readers and writers via metal leads 22. The leads 22 are connected to the readers/writers and are sandwiched between insulating Kapton layers to provide proper electrical insulation between the leads for mechanical structure and to prevent electrical shorting between the leads. Similar flexible cables are also being used in HDD head manufacturing.

The Kapton cable surface may collect electrostatic charge through tribocharging due to handling or repeatedly sliding between fixtures. In this example, an electrostatic charge is shown as a negative charge 24 which induces a positive charge 25 on the surface of the metal leads 22. A uniform distribution of a negative charge 26 remains in the bulk of the metal lead 22, sustaining conservation of charge, and thus, maintaining charge neutrality. However, because Kapton is made of insulating material, tribocharging on the Kapton surface is localized and results in uneven surface charge distribution. As a result, the charge induced on the leads 22 varies with the amount of localization on the Kapton surface. This variation in charge induced on the leads 22 causes a potential difference between the leads 22. Once such potential difference exceeds the dielectric breakdown threshold of the insulation layer 16 (FIG. 1) between the readers 12 and writers 14, electrostatic discharge between the leads damages the tape head. The same occurs for HDD heads.

BRIEF SUMMARY

High impedance electrical shunts are utilized to provide electrostatic discharge protection for heads containing magnetoresistive transducer elements and inductive writers. In one embodiment, a magnetoresistive transducer head assembly according to the present invention comprises a reader element, a writer element, and a high impedance shunt electrically connecting the reader element and the writer element. The high impedance shunt provides a high impedance conductive path for maintaining electrostatic charge equipotential between the reader element and the writer element while they are un-powered. When the leads are connected to a common electrical ground point, the uniform distribution of negative charge in the leads dissipates to equalize the lead potential.

In one implementation, the reader element comprises a magnetoresistive (MR) sensor element and the writer element comprises an inductive element, and the reader element and the writer element are assembled as a piggyback structure, such that the writer element is physically located on-top of the reader element, and the reader electrical contacts are separated from the writer electrical contacts by a thin insulation layer.

Preferably, a high impedance shunt has an impedance value that allows read/write signal measurements via the reader and writer elements for normal read/write operations with the transducer heads, with the high impedance shunt in place. In one example, for device resistances between about 10Ω and 400Ω, and assuming that an acceptable leakage current through the shunt resistors is 0.1% of the current through the device, then the high impedance shunt can have a resistance value between about 10 kΩ and 400 kΩ.

In another embodiment, a magnetoresistive transducer head assembly comprises plural reader elements, plural writer elements and plural high impedance shunts electrically connecting the reader elements and the writer elements. The high impedance shunts provide high impedance conductive paths for maintaining common voltage between the reader elements and the writer elements to reduce electrostatic discharge between the reader and writer elements. The high impedance shunts provide high impedance conductive paths for maintaining electrostatic charge equipotential between the reader elements and the writer elements, while allowing normal operation of the reader elements and the writer elements. In one implementation, at least one writer element lead is connected to a high impedance shunt, and at least one reader element lead is connected to a high impedance shunt, and the shunts which connect the at least one writer and the at least one reader, are connected to a common contact point.

The magnetoresistive (MR) transducer head assembly may further comprise a substrate on which the reader and writer elements are deposited, wherein the high impedance shunts are deposited on the same substrate. The high impedance shunts may instead be deposited on a separate substrate that is bonded to said transducer substrate. The high impedance shunts may also be deposited on a wafer substrate which is fabricated into a flip chip. The flip chip is then bonded to a cable which is connected to the transducers and which provides read/write signals to the transducer head assembly. The high impedance shunts may comprise high impedance thin film resistive elements, tunnel junction resistors, a high impedance bus, etc.

The aspects and advantages of the above mentioned features, along with additional features which are embodied in the invention will become understood with reference to the following descriptions, appended claims, and accompanying figures.

DETAILED DESCRIPTION

Figure 1A:
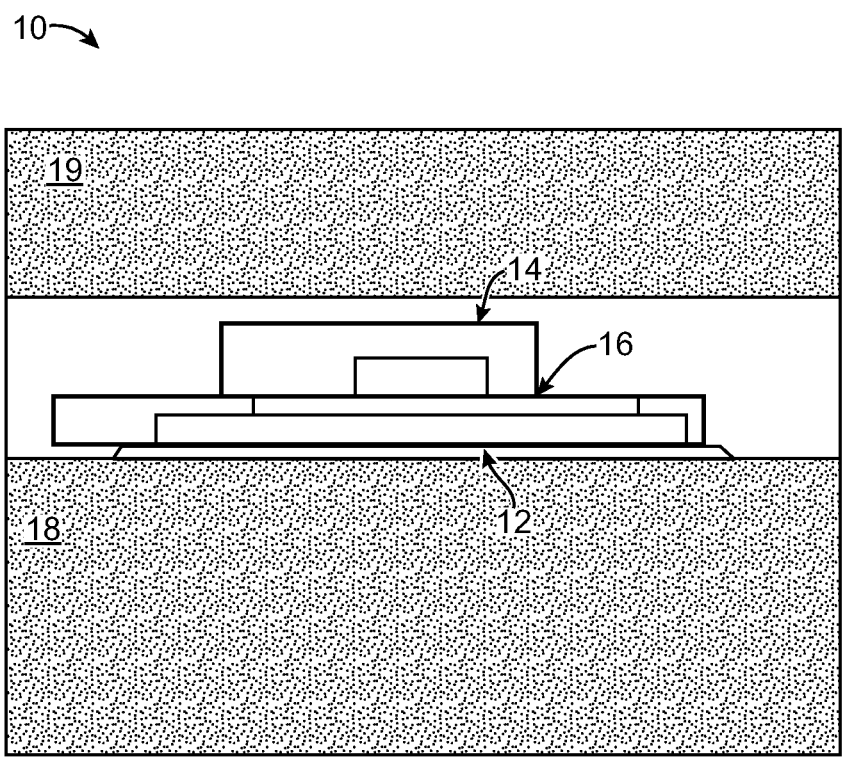
FIG. 1A shows a conventional MR transducer head assembly with a piggyback structure.
Figure 1B:
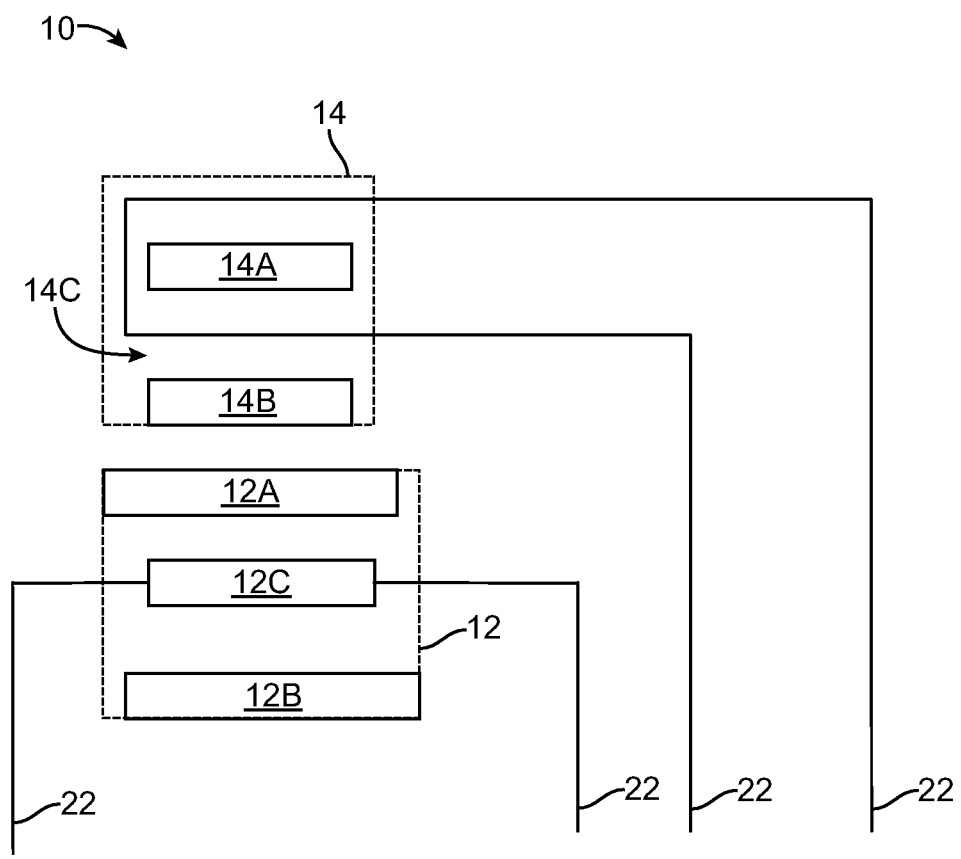
FIG. 1B shows a schematic view of the MR transducer head assembly with a piggyback structure of FIG. 1A.

Shunts for magnetoresistive (MR) heads, including readers and writers, for protecting against electrostatic discharge between readers and writers therein are provided. In one embodiment of the invention, a shunt comprises a high impedance (high resistance) shunt that reduces the occurrence of electrostatic discharge in MR heads by equalizing the relative charge potential between the readers and writers in an MR head when electrically un-powered (i.e., not coupled to an electrical power source). The high impedance shunt provides a high impedance conductive path for maintaining electrostatic charge equipotential between the reader elements and the writer elements when isolated from a measuring device, but provides sufficient electrical isolation during measurements and operation.

When at least one of the leads is connected to an external electrical contact point, such as a ground point, the uniform distribution of negative charge in the leads dissipate to equalize the lead potential. An additional high impedance shunt may also be disposed between common points where the reader and writers are connected together and an external electrical contact point. This additional high impedance shunt is selected to limit the current dissipated to the external contact point while forming the common contact between the readers and writers and the external device.

An example implementation is described below for an MR head assembly comprising read/write transducers utilizing MR read sensors, such as a piggyback MR head for tape storage drives. Generally, a piggyback magnetic head assembly includes an MR read assembly (reader) and an inductive write assembly (writer) formed as a piggyback structure. As noted, a piggyback structure is one where a writer is physically located on top of a reader in the wafer processing. In the piggyback structure, the reader elements and the writer coils are separated by a thin oxide layer which is susceptible to damage by dielectric breakdown if the voltage of the readers and writers exceeds the damage threshold of the insulating material. The MR could be an anisotropic (A) MR, a giant (G) MR, or a tunneling (T) MR. However, the present invention is not limited to MR sensors. As such, the reader can be any sensitive sensor device which is located sufficiently close to another device (here a writer) where the separation between the two devices is small enough to result in a dielectric breakdown between the two devices at some voltage level that may be encountered during transducer head fabrication or processing.

To prevent a build up of potential differences between readers and writers, each conductive lead to the readers and writers is electrically connected to a high impedance resistor. The resistors are electrically connected together and in one example are also connected to a common electrical point. The resistors can have different values, same values, or a combination thereof, to satisfy certain criteria in preventing against electrostatic discharge (ESD).

Figure 3:
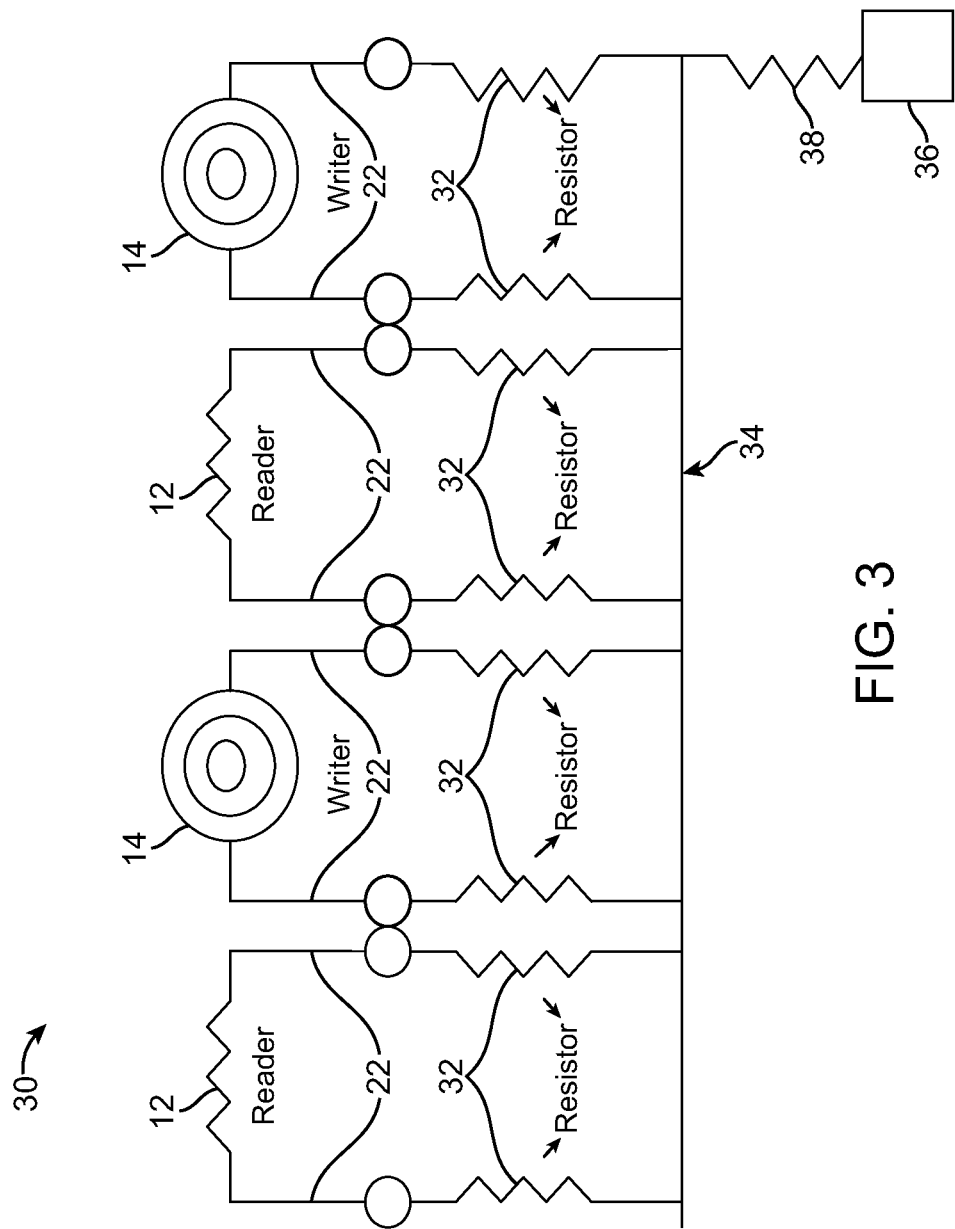
FIG. 3 shows an example shunt circuit of discrete high impedance shunts for an MR transducer head assembly, according to an embodiment of the present invention.

FIG. 3 shows a schematic of an example shunt circuit 30 including discrete shunt resistors 32, for a high impedance shunt in an MR head having multiple leads 22 for readers 12 and writers 14, according to the present invention. Each discrete shunt resistor 32 is connected in series with a lead 22, and the resistors 32 are electrically connected together via a common electrically conductive path 34, to bring the readers 12 and writers 14 into equipotential.

An additional high impedance resistive element 38 may be utilized, with a first end of the additional resistive element connected to the common point (e.g., common path 34) on the head or cable connecting the readers and writers, and a second end of the additional resistive element connected to the external common electrical contact point 36. This additional resistive element 38 limits the current flow between the readers and writers and the external device during first contact. In one example, the second end of the additional resistive element 38 is connected to the external ground of a tester or device to which the transducer elements are to be connected to allow the potentials of the transducer elements to equilibrate to the potential of the external device, thereby reducing the chance of ESD and resulting damage. As such, the common path 34 is connected to an external common electrical contact point 36, such as ground, through a resistor 38 to allow discharge of the electrostatic charge accumulated in the readers/writers through the leads 22 and the high impedance shunt resistors 32 to the contact point 36 via the common path 34.

The high impedance of the shunt resistors 32 controls the time dependence of the discharge of accumulated electrostatic charge between the readers and writers while the resistor 38 controls the time dependence of the discharge to the external contact.

The shunt circuit protects the readers 12 against OHL type of ESD failure, and protects against ESD between the readers 12 and writers 14, such as dielectric breakdown. The shunt resistors 32 are of sufficiently high impedance to not interfere with resistance measurements of the readers 12 and writers 14 or their normal operation. Further, the shunt resistors 32 are of sufficiently low impedance to provide ESD protection. The resistors 32 provide protection against ESD damage while enabling resistance measurements during a manufacturing process, while not interfering with other electrical tests of the readers and writers or their normal read/write function.

The high impedance shunt resistors have resistance values that allow read/write signal measurements via the transducer heads for normal read/write operations with the transducer heads, without requiring removal of the high impedance shunt resistors. A criteria for choosing a shunt resistance value ($R_{shunt1}$) of a shunt resistor 32 for electrically connecting together the transducer elements (i.e., the readers 12 and writers 14) with leads 22 within the cable 20, is to maintain an equipotential (i.e., equal potential) voltage between the transducer elements while in the un-powered state during manufacturing, fabrication and assembly processes while not significantly affecting the performance of the transducer elements. To maintain an equipotential between the transducer elements, the shunt resistance should be as low as possible. To maintain the performance of the transducer elements, the shunt resistance should be as high as possible.

As an example, if $R_{shunt1}$ represents the shunt resistance across a transducer element (reader or writer) having a resistance $R_{dut}$, then the ratio ($R_{dut}/R_{shunt1}$) represents the leakage current through $R_{shunt1}$ rather than through $R_{dut}$. Such leakage current results in signal loss, degrading the transducer element performance. For MR heads used in tape drives, a 0.1% loss of signal may be acceptable. For AMR, GMR, and TMR reader elements, the resistance values are usually between 10Ω and 400Ω. Thus, acceptable choices for $R_{shunt1}$ for maintaining reader element performance can be, e.g., between 10 kΩ and 400 kΩ, with the lower and higher range shunt resistance values being used for the lower and higher resistance values of the reader element.

Another criterion for choosing a shunt resistance value involves verification of whether the values of $R_{shunt1}$ are too high to achieve rapid charge equilibration of the different transducer elements. Electrostatically charging the cable 20 by tribocharging events, which are mechanical in nature, is slower than a microsecond range and is often in the millisecond range. Typical capacitance values of leads 22 in a cable 20 are of the order of 10 pf. Thus, with shunt resistance $R_{shunt1}$ between 25 kΩ and 400 kΩ, the RC time constant is between 2.5 to 40 ns, allowing the leads 22 to remain at an equipotential voltage during the tribocharging event, which prevents ESD events.

In tape and HDD transducer heads, both readers and writers are connected via the same cables 20. The resistance/impedance of the writers is usually about 15Ω to 20Ω. As such, the above shunt resistance selection criterion for readers also applies to the writers to prevent internal ESD with the readers. Furthermore, the readers and writers do not function simultaneously, such that an additional pick-up of the write signals by the readers is not important from a performance perspective. However, it is important to minimize the loss of the write signal through the read leads (lines) and visa versa. A simple calculation shows that a shunt between a reader and a writer of greater than about 10 kΩ does not cause substantial leakage.

In one example, for a writer with an impedance ($R_{write}$), a write current ($I_{write}$), and a high impedance shunt resistance ($R_{shunt1}$), the leakage current from the writer to the reader is of the order of $I_{write} \times (R_{write}/R_{shunt1})$. For an $R_{write}$ of 20Ω and an $R_{shunt1}$ of 10 kΩ, the leakage current into the reader is 0.2% of the write current. For an $I_{write}$ of 20 mA, the leakage current would be 0.04 mA, which would not cause damage to a typical MR sensor used in the magnetic media storage industry. In one example, where the readers have a resistance of about 50 to 150Ω, and the writers have a resistance of about 10 to 35Ω, each resistor 32 can comprise a resistor with a value of about 100 kΩ.

Another component typically used in a tape drive head is a servo, which is an MR reader used to align the readers and writers on the proper track on the tape. In HDD devices, the reader serves as the servo. The servos are sensitive to ESD damage and preferably also include charge dissipative shunt connections ($R_{shunt1}$). Although some tape products do same-gap-servo tracking so that the servos are reading data at the same time as the writers on the same cabled module are operating, since the servos operate at a frequency outside the range of the writers, the writer leakage can be further suppressed, through the use of filters.

Figure 4:
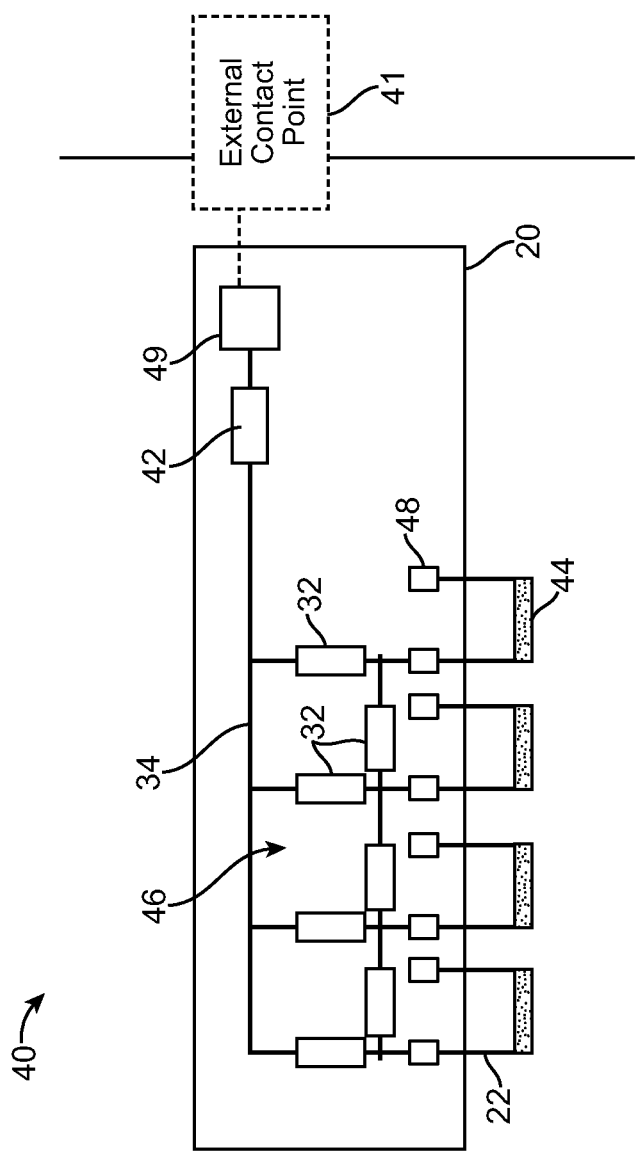
FIG. 4 shows an example shunt circuit of a high impedance bus bar shunt for an MR transducer head assembly, according to an embodiment of the present invention.

Referring to FIG. 4, in addition to the shunt resistors 32, a shunt circuit 40 according to another implementation of the present invention includes a shunt resistor 42 with a resistance value $R_{shunt2}$, for connecting the transducer elements 44 (i.e., readers 12 and writers 14) to an external device 41 such as a continuity tester for electrical measurements. The shunt resistors 32 are connected in a conductive bus bar configuration 46, and the resistor 42 is optimally located on the cable 20 in order to minimize the capacitance between the transducer elements and the resistor 42. The bus bar comprises strips of electrically conductive material which are of high impedance, shown as high impedance resistive elements 32 in FIG. 4. The shunt circuit 40 further includes transducer element contact pads 48 and an external device contact pad 49.

The value $R_{shunt2}$ is selected to minimize the current through, or the voltage across, the transducer elements. Modeling the shunt circuit as a simple resistor-capacitor circuit (RC circuit) of capacitance C, dissipative resistance $R_{shunt2}$ and transducer element 44 resistance $R_{dut} \ll R_{shunt2}$, then the RC time constant for dissipation can be represented as $\tau_{RC} \sim CR_{shunt2}$. For a voltage difference V between the cable 20 and an external device, the electrostatic charge ($Q_o$) on the cable 20 is the mathematical product of C and V.

The peak current ($I_{peak}$) through the transducer element, then is: $I_{peak} = Q_o/\tau_{RC} = V/R_{shunt2}$. The peak voltage ($V_{peak}$) 1 across the transducer element 44 of resistance $R_{dut}$ then would be: $V_{peak} = V(R_{dut}/R_{shunt2})$, which drops the value of the voltage differential by the ratio of the device resistance to the shunt resistance $R_{shunt2}$, indicating as high a value for $R_{shunt2}$ as possible for protection against ESD. The upper limit of $R_{shunt2}$, then would be from a practical value for testing purposes (time constant, $\tau_{RC}$, short duration). Assuming that the cable capacitance is substantially lower than the external test device capacitance, the cable 20 will reach the test device voltage within a time $\tau_{RC}$. With an external device resistance of 100Ω, and a value of 10 pf for C, then $R_{shunt2}$ values of 100 kΩ to 10 MΩ would yield voltage protection suppressions of between a factor of 1 k and 100 k, and discharge times of between 1 and 100 microseconds. Thus, example resistance values for $R_{shunt2}$ within this range are reasonable.

Figure 5:
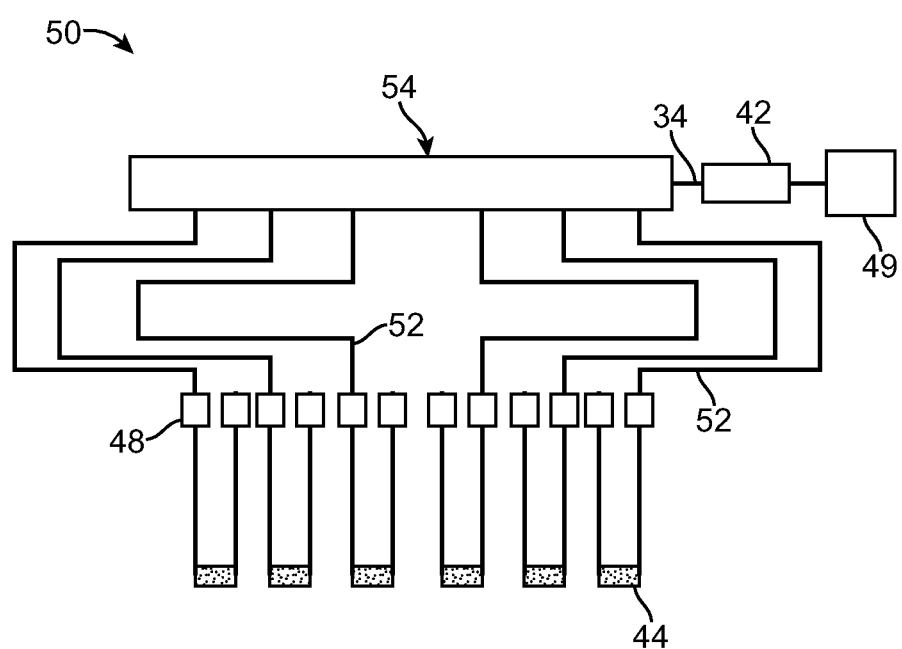
FIG. 5 shows another example shunt circuit of a high impedance bus bar shunt for an MR transducer head assembly, according to an embodiment of the present invention.

FIG. 5 shows another example shunt circuit 50 according to the invention, wherein thin film high impedance shunt resistors 52 are used in place of the discrete high impedance shunt resistors 32. Each shunt resistor 52 has a shunt resistance $R_{shunt1}$. The shunt resistors 52 are connected via a bus bar 54. The shunt circuit 50 also includes the external device shunt resistor 42 with resistance $R_{shunt2}$ as described above.

An example thin film resistor comprises a Tantalum (Ta) material for a thin film resistor dimension. However, the choice of material is not restricted to Ta. For example, to achieve 10 kΩ shunt resistance $R_{shunt1}$, a Ta thin film of length 35 mm, width 4 µm and thickness 100 nm can be deposited as shown on the transducer substrate. $R_{shunt1}$ can be determined as:

$$R_{shunt1} = R_{ho} \times L/(H \times W),$$

Where
H: height,
W: width,
L: length,
$R_{ho}$: Ta resistivity.

For example, when:
$R_{ho}$=1.35e-7 ohm*m
L=35e-3 m
W=4e-6 m
H=100e-9 m,
$R_{shunt1}$=1.1813e+004.

As such, the shunt resistors can comprise standard sheet resistors. Alternatively, the resistors can comprise Tunnel Junction (TJ) resistors, such as 100 kΩ TJ resistors. High resistance values are selected to avoid interference with the normal operation of the MR readers (sensors) and writers, and minimize cross-coupling therebetween.

TJ resistors may be used according to the present invention. The resistance ($R_{TJ}$) of a tunnel junction resistor with a tunneling layer of thickness L is inversely proportional to the tunneling probability, T(L), as:

$$R_{TJ} = R_o/[T(L) \times HD] = [R_o/HD]\exp(L/\lambda),$$

with $\lambda = (hc/4\pi)/(2mc^2(U-\in))^{0.5} \sim (hc/4\pi)/(2mc^2U)^{0.5}$,
U is the potential energy of the tunnel barrier, h is Planck's constant (hc=12,398 eV Å), c (3.0×10⁸) is the speed of light in vacuum, m (mc²=0.5 MeV) is the mass of an electron. Note that $\in \sim k_B T$ (~25 meV), T is tunneling probability, L is the thickness, while U is potential energy of the order of several eV, HD is the surface area of the resistor interface and X and $R_o$ are properties of the tunnel junction materials (see Quantum Physics, Berkeley physics course, volume 4, by E. Wichmann, McGraw-Hill, pp. 288-292). To determine the order of magnitude of λ, U can be taken as a constant in the range of the order of 1 eV. Using value 1 eV and 4 eV, the resulting values of λ are: 0.1 nm and 0.05 nm. As a specific example, the parameters given for a magnetic TJ can be used (see S. P. Parkin, K. P. Roche, M. G. Samant, P. M. Rice, R. B. Beyers, R. E. Scheuerlein, E. J. O'Sullivan, S. L. Brown, J. Bucchigano, D. W. Abraham, Yu Lu, M. Rooks, P. L. Trouilloud, R. A. Wanner, and W. J. Gallagher, J. of Applied Physics, volume 85(8), 1999, pp. 5828-5833). The variability with magnetization affects the $R_o$, and is not included in this analysis. Furthermore, materials whose tunnel resistances are affected by the magnetization of the junction materials are not preferable for this purpose. As an example, using a value of 0.12 nm for λ and 8.4×10⁻¹⁴ Ωm² for $R_o$, a high impedance shunt resistor can be constructed using the parameters given in Tables 1 and 2, below.

TABLE 1

Tunnel Junction parameters to achieve resistances from 100 to 1,000,000 ohms. A value of 0.12 nm for λ and 8.4 × 10⁻¹⁴ Ωm² for $R_o$, and an area of 10⁻¹² m². The relative permittivity of the insulating area is taken to be 3.

| R | Ohms | 100 | 1,000 | 10,000 | 100,000 | 1,000,000 |
|---|------|-----|-------|--------|---------|-----------|
| L | nm | 0.85 | 1.12 | 1.40 | 1.68 | 2.00 |
| C | (pf) | 0.031 | 0.024 | 0.019 | 0.016 | 0.013 |

TABLE 2

Tunnel Junction parameters to achieve resistances from 100 to 1,000,000 ohms. A value of 0.12 nm for λ and 8.4 × 10⁻¹⁴ Ωm² for $R_o$, and an area of 4 × 10⁻¹⁴ m². The relative permittivity of the insulating area is taken to be 3.

| R | Ohms | 100 | 1,000 | 10,000 | 100,000 | 1,000,000 |
|---|------|-----|-------|--------|---------|-----------|
| L | nm | 0.46 | 0.74 | 1.01 | 1.29 | 1.57 |
| C | (pf) | 0.0023 | 0.0014 | 0.0011 | 0.00083 | 0.00068 |

A noteworthy quantity for a TJ resistor is the capacitance ($C_{TJ}$), as: $C_{TJ} = k e_o HD/L$, where k is the dielectric permeability of the insulating layer, and $e_o$ (=8.9×10⁻¹² f/m) is the dielectric permeability in a vacuum. Using a value of 1 mm² for HD, 3 for k and 1 nm for L, yields a capacitance $C_{TJ}$ of 0.027 pf, which is negligible for frequencies of 1 GHz. The reader elements are connected to shields with the tunnel junction resistors.

Figure 6A:
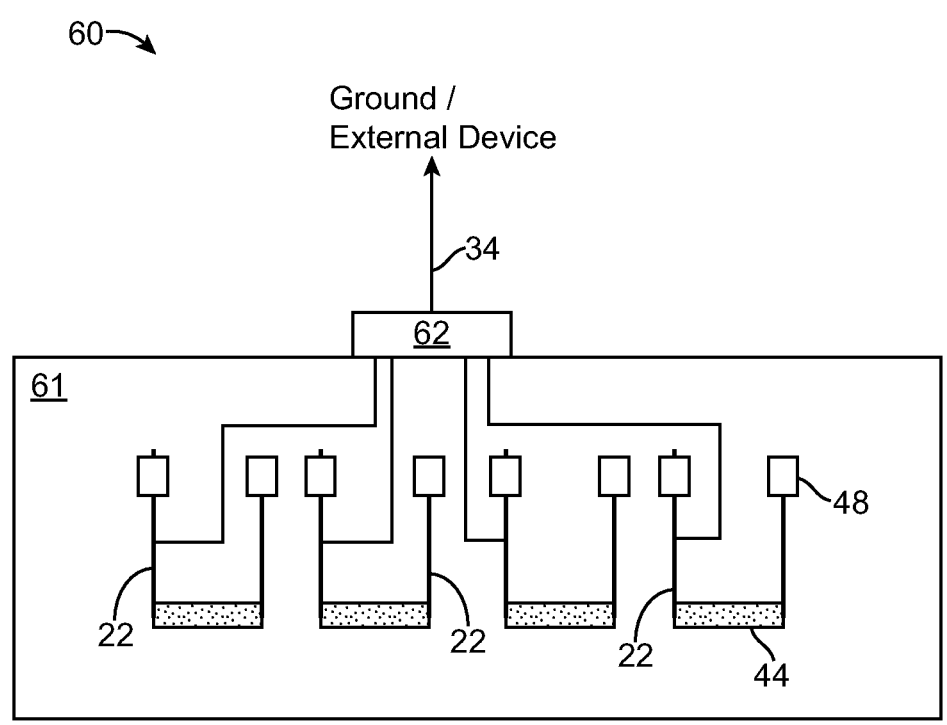
FIGS. 6A and 6B show example placements of the high impedance shunts.

As shown in FIGS. 4 and 5, at least one writer element lead is connected to a high impedance shunt, and at least one reader element lead is connected to a high impedance shunt. In another example head assembly 60 shown in FIG. 6A, shunt resistors for a transducer head 61 including transducer elements 44, can be on an external chip 62 which can be bonded to leads 22 of the transducer elements 44, and bonded to the transducer head substrate or piggyback structure. An example would be to fabricate the high impedance shunt resistors on the chip 62 using either high impedance thin film resistors or TJ resistors or other appropriate high impedance resistors. The advantage of this approach would be that if space on the wafer (substrate) containing the transducer elements 44 is at a premium, then the chip 62 can be connected to the transducer 41 at a later stage.

Figure 6B:
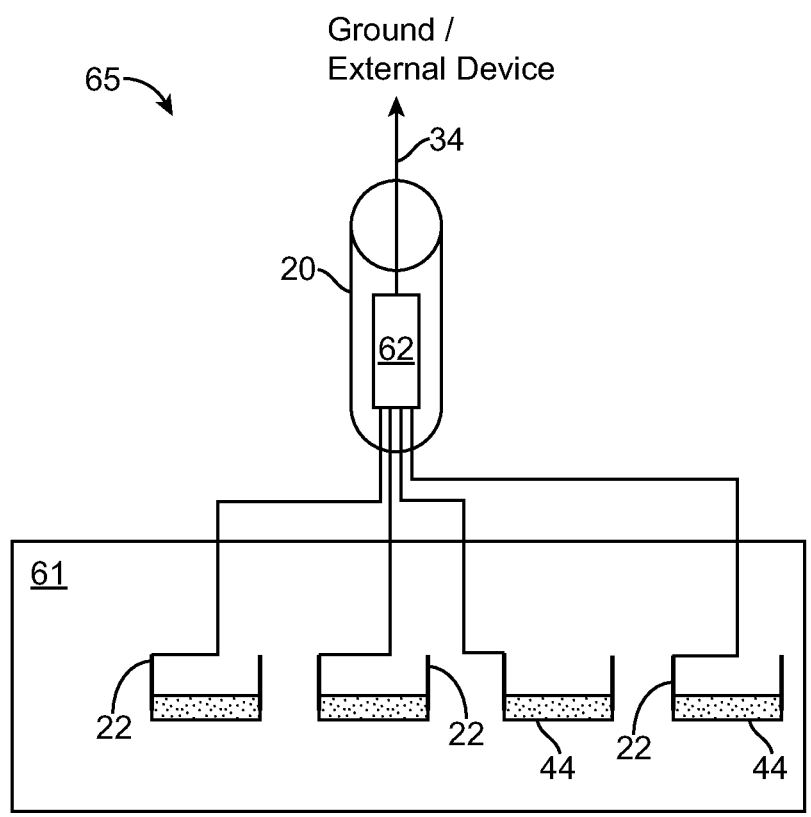

Since much of the ESD damage can occur after the cable 20 containing the leads 22 is attached to the transducer elements 44, in another example head assembly 65 shown in FIG. 6B the chip 62 including the high impedance shunt resistors can be bonded to the flexible cable 20 that is attached to the transducer elements 44. An advantage of attaching the shunt resistors via the chips 62 at a later stage is that defects in making the shunt resistors would not affect the yield of the reader and writer chips. Another advantage of attaching a shunt resistor chip 62 to the cable 20 is that if, for some reason, the processing for the shunt resistors is not available at the same facility as the reader-writer fabrication site, then the shunt resistor chip 62 could be added elsewhere. The high impedance resistance is chosen to be high enough not to interfere with the normal operation of the readers and writers or to couple them together. In addition, the add-on high impedance shunt resistors can be on a flip chip that can be attached to the cable 20 and removed downstream in the manufacturing process.

Figure 7:
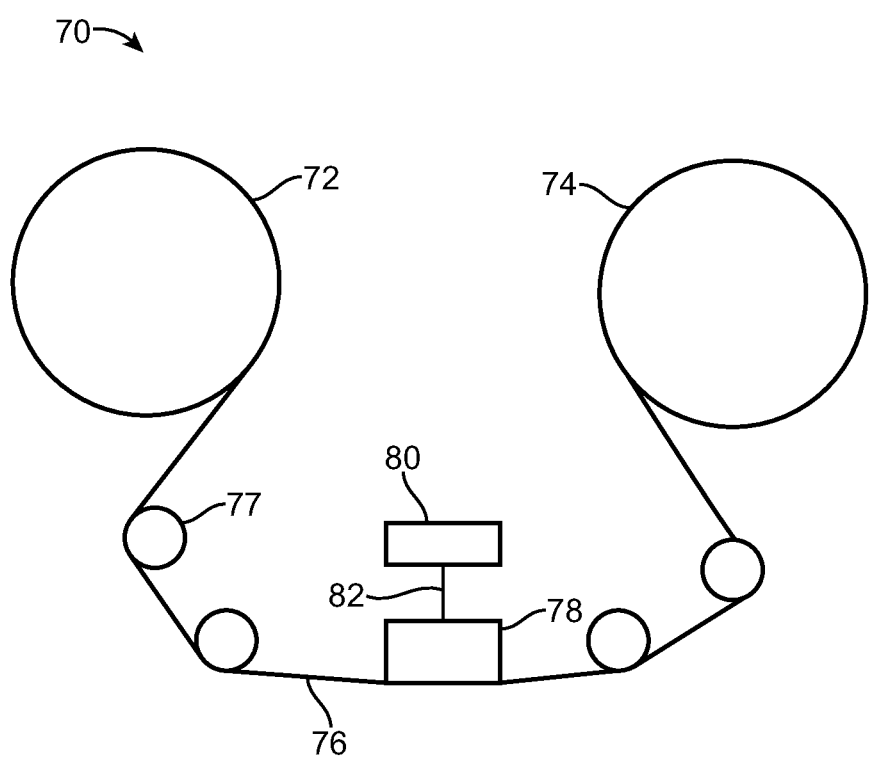
FIG. 7 illustrates an example tape drive which may be employed in the context of the present invention.

FIG. 7 illustrates an example tape drive 70 which may be employed in the context of the present invention. While one specific implementation of a tape drive is shown in FIG. 7, it should be noted that the embodiments of the present invention may be implemented in the context of any type of drive (i.e., hard disk drive, tape drive, etc.) The present invention is also useful with MR technologies with piggyback structured MR elements such as AMR, GMR and TMR technologies utilized in tape and hard disk drive manufacturing for magnetic media storage industries.

Figure 2:
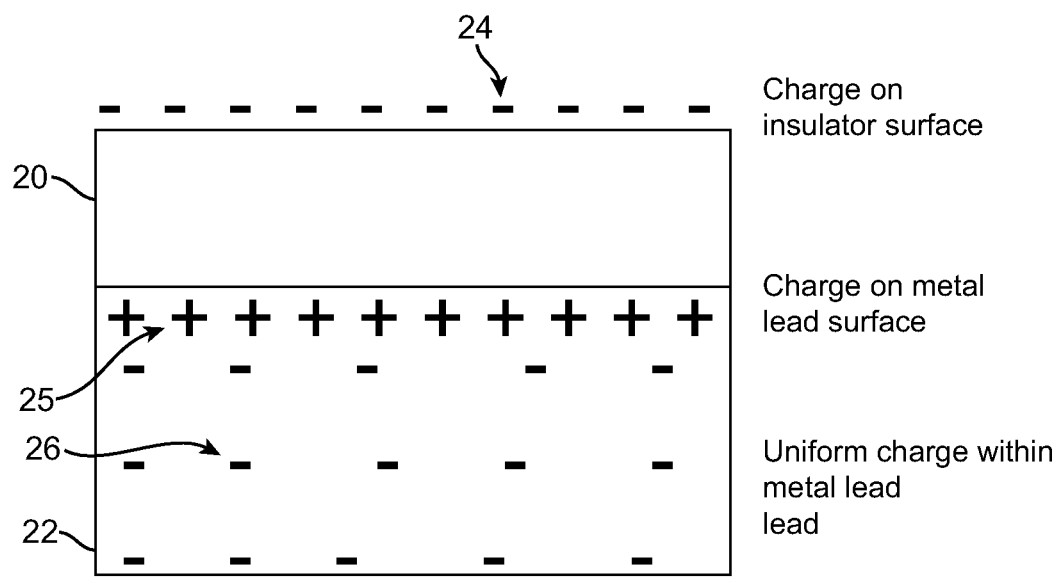
FIG. 2 shows a schematic of electrostatic charges on a cable and on metal leads for transducer elements of a conventional MR transducer head.

As shown in FIG. 7, a tape supply cartridge 72 and a take-up reel 74 are provided to support a tape 76. Moreover, guides 77 guide the tape 76 across a bi-directional transducer head comprising a tape head 78. Such bi-directional tape head 78 is in turn coupled to a control assembly 80 via a MR connector cable 82 (e.g., the insulator cable 20 in FIGS. 2 and 4). A tape drive such as shown in FIG. 7 further includes drive motor(s) to drive the tape supply cartridge 72 and the take-up reel 74 to move the tape 76 linearly over the head 78. The tape drive also includes a read/write channel to transmit data to the head 78 to be recorded on the tape 76 and to receive data read by the head 78 from the tape 76. An interface is also provided for communication between the tape drive and a host to send and receive the data and for controlling the operation of the tape drive and communicating the status of the tape drive to the host, all as understood by those of skill in the art.

The present invention has been described in considerable detail with reference to certain preferred versions thereof; however, other versions are possible. Therefore, the spirit and scope of the appended claims should not be limited to the description of the preferred versions contained herein.

What is claimed is:

1. A transducer head assembly comprising:
    a reader element;
    a writer element;
    a first and second impedance shunt each including at least one lead coupled to an impedance device, wherein the first impedance shunt electrically connects to the reader element and the second impedance shunt electrically connects to the writer element, the first and second impedance shunts are each connected to a common electrically conductive path, wherein the common electrically conductive path maintains electrostatic charge equipotential between the reader element and the writer element that are unpowered; and
    a high impedance resistive element coupled to the common electrically conductive path and an external contact point.

2. The transducer head assembly of claim 1, wherein:
    the reader element and the writer element are assembled as a piggyback structure, such that the reader element is separated from the writer elements by an electrical insulation layer.

3. The transducer head assembly of claim 1, wherein the impedance device comprises one of a thin film impedance shunt resistor and a discrete impedance shunt resistor.

4. The transducer head assembly of claim 1, wherein the common electrically conductive path maintains electrostatic charge equipotential between the reader element and the writer element when isolated from a measuring device, while providing sufficient electrical isolation during measurements and operation.

5. The transducer head assembly of claim 1, wherein the common electrically conductive path discharges electrostatic charge from the reader element and the writer element, wherein each of the first and second impedance shunt controls time dependence of discharge of accumulated electrostatic charge between the reader element and the writer element.

6. The transducer head assembly of claim 1, wherein the transducer head comprises a bi-directional tape head coupled to a control assembly for reading data from a tape cartridge and writing data to the tape cartridge.

7. The transducer head assembly of claim 1, wherein the high impedance resistive element is disposed on a cable providing read/write signals to the reader and writer elements.

8. The transducer head assembly of claim 1, wherein the impedance device comprises a high resistance device disposed on a substrate of the head assembly, and wherein the high impedance resistive element limits current flow between the reader and the writer during first contact of the transducer head assembly with an external device.

9. The transducer head assembly of claim 1, wherein each of the first and second impedance shunt comprises Tantalum film deposited on a substrate of the transducer head assembly.

10. A transducer head assembly comprising:
    plural reader elements;
    plural writer elements;
    plural high impedance shunts each comprising at least one lead coupled to an impedance device, wherein each of the plural high impedance shunts electrically connect to either a particular one of the plural reader elements or a particular one of the plural writer elements, and each of the plural high impedance shunts are coupled to a common electrical path, wherein the common electrical path maintains electrostatic charge equipotential between adjacent reader elements and writer elements that are unpowered; and
    a high impedance resistive element coupled to the common electrical path and an external device contact pad.

11. The transducer head assembly of claim 10, wherein each of the high impedance shunts provide the common electrically conductive paths for maintaining electrostatic charge equipotential between the reader elements and the writer elements.

12. The transducer head assembly of claim 10, wherein at least one writer element lead is connected to a high impedance shunt.

13. The transducer head assembly of claim 10, wherein at least one reader element lead is connected to a high impedance shunt.

14. The transducer head assembly of claim 10 further comprising a substrate on which the reader and writer elements are deposited, wherein the high impedance shunts are deposited on the same substrate.

15. The transducer head assembly of claim 10 further comprising a transducer substrate on which the reader and writer elements are deposited, wherein the high impedance shunts are deposited on a separate substrate that is bonded to said transducer substrate.

16. The transducer head assembly of claim 10, wherein each of the high impedance shunts is deposited on a flip chip which is bonded to a cable that provides read/write signals lines to the transducer head assembly.

17. The transducer head assembly of claim 10, wherein the high impedance shunts comprises Tantalum film resistive elements.

18. The transducer head assembly of claim 10, wherein:
the reader elements and the writer elements are assembled as a piggyback structure, such that each reader element is separated from a writer element by an electrical insulation layer.

19. The transducer head assembly of claim 10, wherein the transducer head comprises a bi-directional tape head coupled to a control assembly for reading data from a tape cartridge and writing data to the tape cartridge.

20. The transducer head assembly of claim 19, wherein the transducer head is integrated in a tape drive system comprising an interface for communicating between the tape drive and a host computer system.

21. A transducer head assembly comprising:
a reader element;
a writer element;
a first and second impedance shunt each including at least one lead coupled to an impedance device, wherein the first impedance shunt electrically connects to the reader element and the second impedance shunt electrically connects to the writer element, the first and second impedance shunts are each connected to a common electrically conductive path, wherein the common electrically conductive path maintains electrostatic charge equipotential between the reader element and the writer element that are unpowered; and
a high impedance resistive element coupled to the common electrically conductive path and an external contact point,
wherein the common electrically conductive path discharges electrostatic charge from the reader element and the writer element, wherein each of the first and second impedance shunt controls time dependence of discharge of accumulated electrostatic charge between the reader element and the writer element,
wherein the transducer head comprises a bi-directional tape head coupled to a control assembly for reading data from a tape cartridge and writing data to the tape cartridge, and wherein the high impedance resistive element is disposed on a cable providing read/write signals to the reader and writer elements.

* * * * *